United States Patent [19]

Tsuge et al.

[11] Patent Number: 4,990,050
[45] Date of Patent: Feb. 5, 1991

[54] WRIST MECHANISM

[75] Inventors: Kazuo Tsuge, Yokohama; Yukio Ohtani, Kawasaki; Noriyuki Utsumi; Satoshi Uehara, both of Yokohama, all of Japan

[73] Assignee: Tokico Ltd., Kawasaki, Japan

[21] Appl. No.: 336,607

[22] Filed: Apr. 10, 1989

Related U.S. Application Data

[63] Continuation of Ser. No. 99,696, Sep. 18, 1987, abandoned, which is a continuation of Ser. No. 787,676, Oct. 15, 1985, abandoned.

[30] Foreign Application Priority Data

Oct. 15, 1984 [JP] Japan ................................ 59-215347
Nov. 15, 1984 [JP] Japan ................................ 59-241355
Jan. 18, 1985 [JP] Japan ................................ 60-7134

[51] Int. Cl.[5] ............................................. B25J 17/02
[52] U.S. Cl. ................................ 414/735; 74/665 A; 74/479; 414/744.5; 901/15; 901/29
[58] Field of Search ............................ 414/735, 744.5; 901/27-29, 15; 74/665 A, 665 C, 479

[56] References Cited

U.S. PATENT DOCUMENTS 4,068,536 1/1978 Stackhouse ...................... 901/29 X
4,499,784 2/1985 Shum .............................. 414/735 X
4,690,012 9/1987 Dahlquist et al. .................... 74/479

FOREIGN PATENT DOCUMENTS 160790 11/1981 Japan .

Primary Examiner—David A. Bucci
Assistant Examiner—Donald W. Underwood
Attorney, Agent, or Firm—Cushman, Darby & Cushman

[57] ABSTRACT

A wrist mechanism including: at least three rigid elements each having an element axis, said rigid elements being connected in series so that adjacent two elements are rotatable relative to each other about a rotation axis, the rotation axis of said two adjacent rigid elements intersecting said element axes thereof, each rotation axis of each rigid element intersecting adjacent rotation axis; a first rotating mechanism for rotating every second rigid element relative to the other rigid elements; a second rotating mechanism for rotating the other rigid element relative to said every second rigid element.

13 Claims, 18 Drawing Sheets

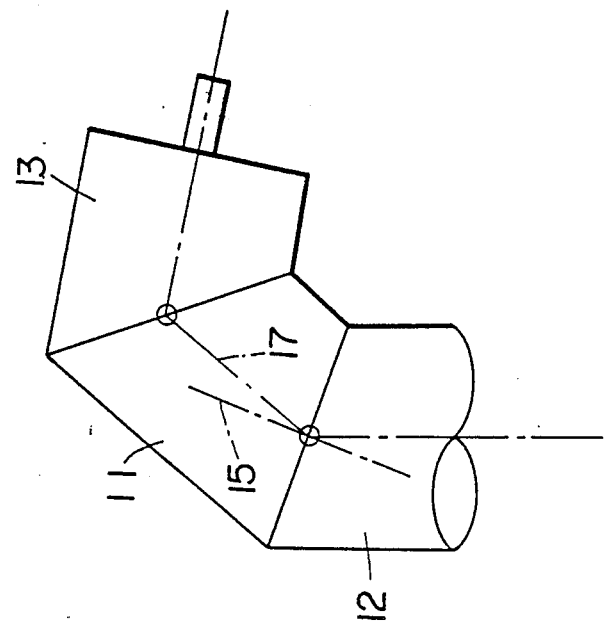
FIG. 3
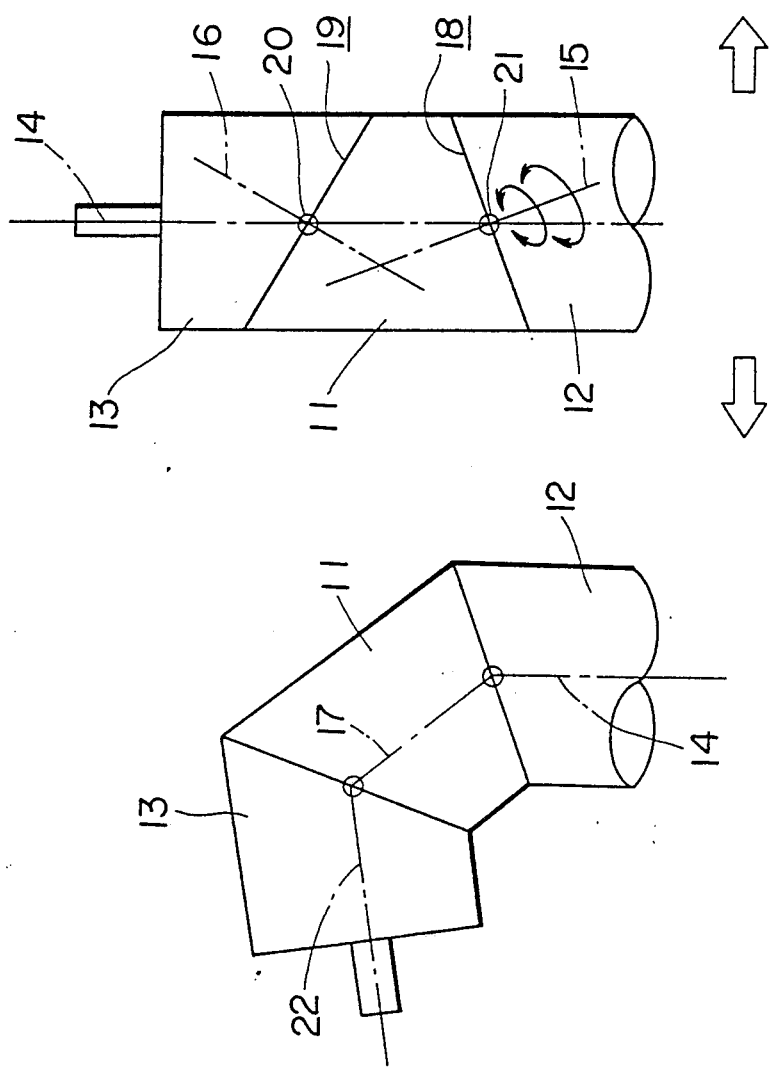
FIG. 5
FIG. 4

WRIST MECHANISM

This is a continuation of application Ser. No. 07/099,696, filed Sept. 18, 1987, now abandoned, which was a continuation of 06/787,676, filed Oct. 15, 1985, now abandoned.

BACKGROUND OF THE INVENTION

1. Field of the Invention

The present invention relates to a wrist mechanism attached to, for example, a distal end of an arm of an industrial robot.

2. Prior Art Statement

Industrial robots are usually provided with bendable wrist mechanisms. Japanese Utility Model (18-month) Publication 56-160790 discloses a representative wrist mechanism as shown in FIGS. 1 and 2, in which a link mechanism 3 is jointed by means of a universal joint to a base member 1 attached to a robot body, the link mechanism 3 including one or more links 6 jointed by means of universal joints. Connecting rods 2 are attached to links 6 by means of universal joints mounted to the opposite ends thereof. The distal link 6 is provided with an operating tool 4. This wrist mechanism is, as shown in FIG. 2, bent by actuating a cylinder 5 of which rod is connected to the proximal link 6.

This prior art wrist mechanism is disadvantageous in that it is rather complicated in structure and large in size in spite of small rigidity since a large number of links and universal joints are used, and in that it is rather small in working area. Furthermore, the wrist mechanism necessitates a dust cover for preventing dust from entering into the connecting points.

SUMMARY OF THE INVENTION

Accordingly, it is an object of the present invention to provide a wrist mechanism which is less complicated in structure and which can be miniaturized with sufficient rigidity.

It is another object of the present invention to provide a wrist mechanism which is capable of bending in a fairly large degree, thus enabling use in a relatively small space.

It is a further object of the present invention to provide a wrist mechanism which dispenses with any dust cover.

With these and other objects in view the present invention provides a wrist mechanism including: at least three rigid elements each having an element axis, said rigid elements being connected in series so that adjacent two elements are rotatable relative to each other about a rotation axis, the rotation axis of said two adjacent rigid elements intersecting said element axes thereof, each rotation axis of each rigid element intersecting adjacent rotation axis; a first rotating mechanism for rotating every second rigid element relative to the other rigid elements; a second rotating mechanism for rotating the other rigid element relative to said every second rigid element.

BRIEF DESCRIPTION OF THE DRAWINGS

In the drawings:

FIG. 3 is a diagrammatical side view of a wrist mechanism according to the present invention;

FIG. 4 is a diagrammatical side view of the wrist mechanism in FIG. 3 when it is bent in a direction;

FIG. 5 is a diagrammatical side view of the wrist mechanism in FIG. 3 when it is bent in another direction;

DETAILED DESCRIPTION OF THE PREFERRED EMBODIMENTS

Figure 1:
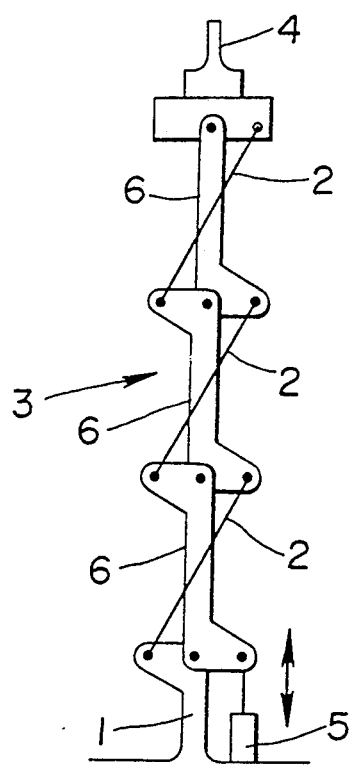
FIG. 1 is a side view illustrating one typical wrist mechanism of the prior art.
Figure 2:
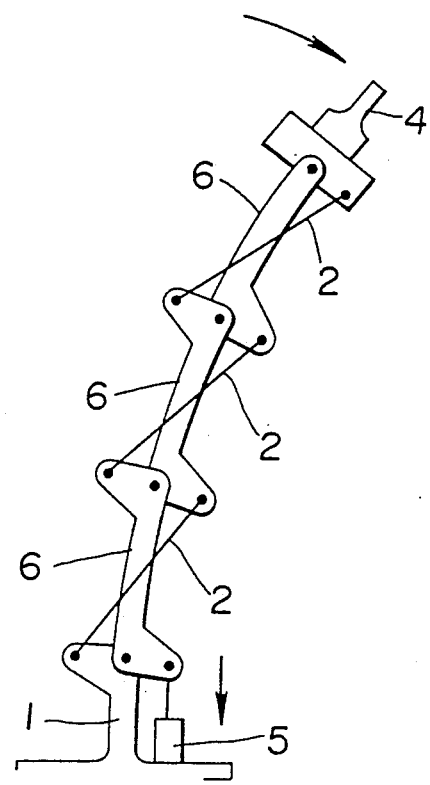
FIG. 2 is a side view of the prior art wrist mechanism in FIG. 1 when it is bent.

Several embodiments of the present invention will be described with reference to the drawings, in which similar parts are designated by like reference characters throughout the several embodiments, and after once every part is illustrated, descriptions of similar parts will be omitted.

Referring to FIGS. 3-5, there is diagrammatically illustrated the general construction of a wrist mechanism according to the present invention. The wrist mechanism is as a whole in the shape of a cylinder when it is in a shown in FIG. 3. The wrist mechanism is divided into three parts by two inclined rotation planes 18 and 19 which are inclined with respect to the axis 14 of the wrist mechanism in FIG. 3. These three parts are connected in series and include an intermediate member 11, a first end member 12 which is rotatably connected to one end of the intermediate member 11, and a second end member 13 which is rotatably connected to the other end of the intermediate member 11. The first end member 12 is supported on a supported arm (not shown) of an industrial robot so as to be rotatable about its axis 14. The first end member 12 and the second end member 13 are connected by means of universal joints 20 and 21 as transmission means. The member 11 is mounted to the member 12 to be rotatable relative to the member 12 about a first rotation axis 15 perpendicular to the inclined plane 18. The connecting point or center of the universal joint 20 may be placed on the rotation axis 15. The second end member 13 is mounted to the intermediate member 11 to be rotatable to each other about a second rotation axis 16 perpendicular to the inclined plane 19. The center of the universal joint 21 may be located on the rotation axis 16. The first and second rotation axes 15 and 16 intersect with a predetermined angle and cross the axis 14. A first rotating mechanism which will be described hereinafter is provided to the wrist mechanism for driving the intermediate member 11 so as to rotate about the first rotation axis 15. Further, there is, as hereinafter described, provided a second rotating mechanism for rotating the first end member 12 and second end member 13 about respective rotation axes 15 and 16. The second rotating mechanism includes the universal joints 20 and 21 for transmitting the rotation of the first end member 12 to the second end member 13 to rotate the second end member 13 about the second rotation axis 16.

The wrist mechanism above described generally operates as follows. Universal joints 20 and 21 are used for preventing the relative rotation of the first and second end members 12 and 13. When the first end member 12 is set stationary with respect to the supporting arm of the robot and when in this condition, the intermediate member 11 is rotated 180° by the first rotating mechanism about the first rotation axis 15 in one direction, the second end member 13 follows the center member without rotation, so that the second end member 13 is shifted to, for example, a position shown in FIG. 4 in which the axis 22 of the second end member 13 crosses the axis 14 of the first end member 12. When the first end member 12 is rotated 180° relative to the supporting arm by means of the second rotating mechanism in this condition, the second end member 13 is shifted in the opposite direction to a position shown in FIG. 5.

Figure 6:
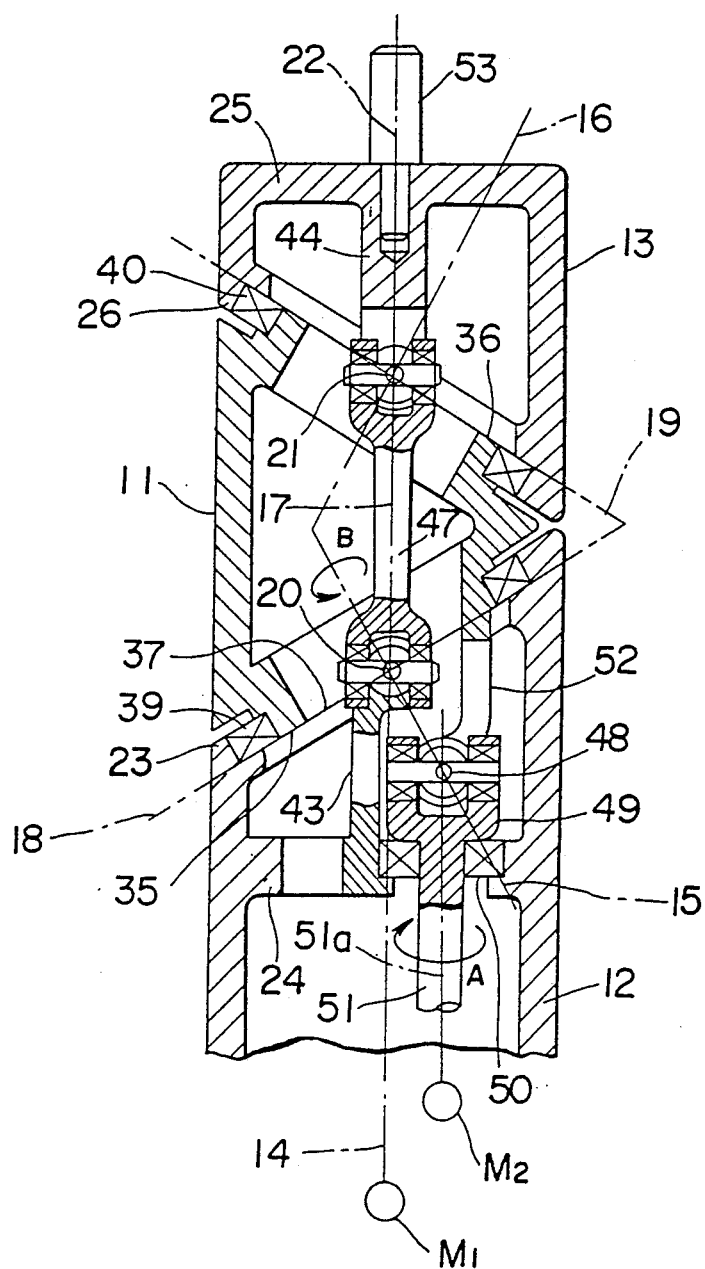
FIG. 6 is an enlarged, partly broken away, axial-sectional view of the wrist mechanism in FIG. 3.
Figure 7:
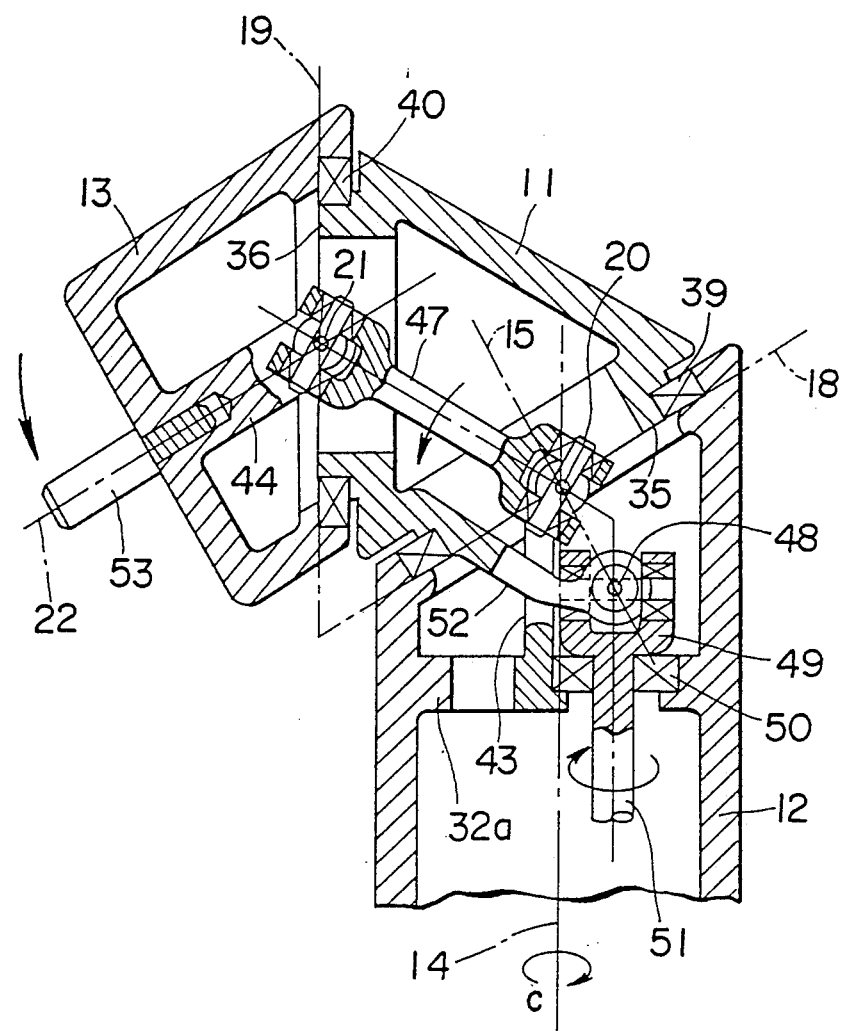
FIG. 7 is an axial-sectional view of the wrist mechanism in FIG. 6 when it is bent.

The wrist mechanism above described is illustrated in more specific form in FIGS. 6 and 7, in which the intermediate member 11 has a substantially hollow cylindrical shape and is provided with inclined opposite ends 35 and 36. Faces of the ends 35 and 36 are on the inclined rotation planes 18 and 19, respectively. The first end member 12 has a substantially hollow cylindrical shape and is provided with an inclined front end 23. The face of the inclined front end 23 is disposed parallel with the inclined rotation plane 18 and adjacent to one end 35 of the intermediate member 11. The first end member 12 is provided at its inner wall with a partition wall 24. The second end member 13 has a substantially hollow cylindrical shape. The second end member 13 is provided with a closed front end wall 25 and with an inclined rear end 26. The face of the rear end 26 is placed in parallel with the inclined rotation plane 19 and adjacent to the other end 36 of the intermediate member 11. The intermediate member 11 and the first end member 12 are provided at their adjacent ends 35 and 23 with a ball bearing 39 so that the bearing 39 is coaxial with the axis 15. The intermediate member 11 and the second end member 13 are provided at their adjacent ends 36 and 26 with another ball bearing 40 so that the bearing 40 is coaxial with the axis 16. With such a construction, the first end member 12 is rotatable relative to the intermediate member 11 about the axis 15 which is perpendicular to the rotation plane 18 and slantingly crosses the axes 14 and 17 thereof. Also, the second end member 13 is rotatable relative to the intermediate member 11 about another rotation axis 16 which is perpendicular to the rotation plane 19 and slantingly crosses the axes 17 and 22 thereof. The rotation planes 18 and 19 are defined to form a predetermined angle between the axes 15 and 16. The first and second end members 12 and 13 are connected through two universal joints 20 and 21 which are connected by a connecting arm 47, the connecting arm passing the intermediate member 11 along the axis 17 thereof. One arm 43 of the universal joint 20 is erected on the partition wall 24 so as to locate the center of the joint 20 at an intersection among the axes 14, 15 and 17. On the other hand, one arm 44 of the other universal joint 21 is integrally formed with the inner wall of the closed end 25 of the second end member 13 so that the center of the universal joint 21 is placed at an intersection among the axes 16, 17 and 22. Thus, the first and second end members 12 and 13 are arranged so that they are not capable of rotating relative to each other.

Another universal joint 49 as the first rotating means is provided to the partition wall 24 of the first end member 12 so that the center 48 thereof is located on the first rotation axis 15. One arm 51 of the universal joint 49 axially passes through the partition wall 24 and is supported on it through a ball bearing 50 so that the universal joint 49 is rotatable about the axis 51a of the arm 51. The other arm 52 of the universal joint 49 is integrally formed with the one end 35 of the intermediate member 11 so that the arm 52 projects from the one end 35 into the first end member 12. The second end member 13 has an operating tool attachment 53 screwed to the center of the outer face of the closed end 25 thereof.

In use of the wrist mechanism thus constructed, the arm 51 of the universal joint 49 is connected to an electric motor $M_2$ for rotation about the axis 51a thereof, the electric motor $M_2$ being attached to a supporting arm (not shown) of an industrial robot. Further, the rear end of the first end member 12 is connected to an electric motor $M_1$ for rotating the first end member 12 about the axis 14. The electric motor $M_1$ is also attached to the supporting arm of the industrial robot.

When the first end member 12 is set stationary to the distal end of the arm to prevent the first end member 12 from rotating with respect to the supporting arm, the arm 51 of the universal joint 49 is rotated by energizing the motor $M_2$ about the axis 51a, for example, in the arrowed direction A in FIG. 6, with the result that the intermediate member 11 is rotated in the arrowed direction B through the universal joint 49. During this operation, the second end member 13 follows the change in the position of the rotation plane 19 without rotation about the axis 22 since it is prevented by the universal joints 20 and 21 from rotation. Thus, the second end member 13 is moved to a position shown in FIG. 7 when the intermediate member 11 is rotated 180° about the rotation axis 15.

In order to place the second end member 13 at a position opposite to the position shown in FIG. 7 with respect to the axis 14, the arm 51 is set stationary and then the first end member 12 is rotated 180° about the axis 14.

Figure 8:
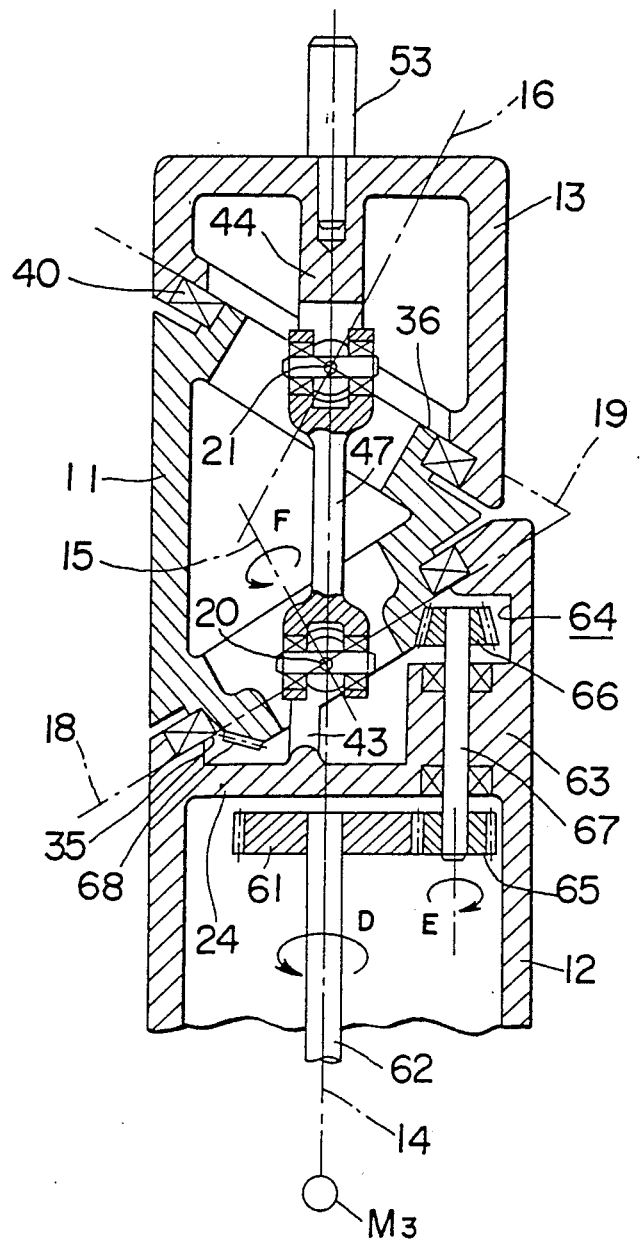
FIG. 8 is a partly broken away, axial-sectional view of a second embodiment of the present invention.
Figure 9:
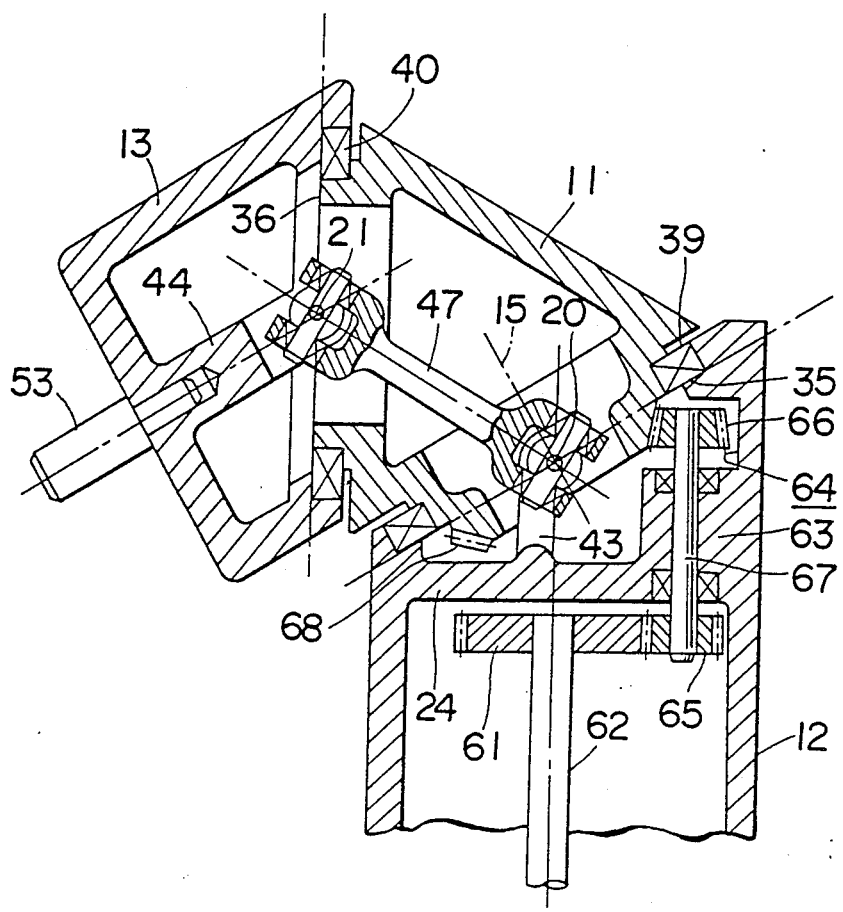
FIG. 9 is a partly broken away, axial-sectional view of the wrist mechanism in FIG. 8 when it is bent.

In FIGS. 8 and 9, there is illustrated the second embodiment of the present invention, in which a toothed wheel mechanism is used in place of the universal joints 49. More specifically, a spur gear 61 is disposed within the first end member 12 so as to be rotatable about the axis 14. The shaft 62 of the spur gear 61 is connected to an electric motor $M_3$ mounted on a supporting arm of an industrial robot (not shown). At an upper peripheral portion of the partition wall 24 there is provided a bearing portion 63 integrally formed with the partition wall 24 and the inner wall of the first end member 12. A shaft 67 axially passes through and is rotatably supported on the bearing portion 63. The shaft 67 has a spur gear 65 mounted on the inner end thereof and a bevel gear 66 mounted on the outer end thereof. The spur gear 65 meshes with the spur gear 61. The bevel gear 66 is received in a recess 64 defined by the bearing portion 63 and the inner wall of the first end member 12. The bevel gear 66 meshes with a bevel gear 68 which is formed in the rear end 35 of the intermediate member 11 so as to be concentric with the rotation axis 15. The bevel gear 68 projects into the front end portion of the first end member 12.

When the rotating shaft 62 is rotated, for example, in the arrowed direction D in FIG. 8, the intermediate member 11 is rotated in the arrowed direction F about the first rotation axis 15 via the spur gears 61 and 65 and bevel gears 66 and 68. The second end member 13 is moved to a position shown in FIG. 9 when the intermediate member 11 is rotated 180° and then the second end member 13 is returned to the original position in FIG. 8 when the intermediate member 11 is further rotated 180°.

Figure 10:
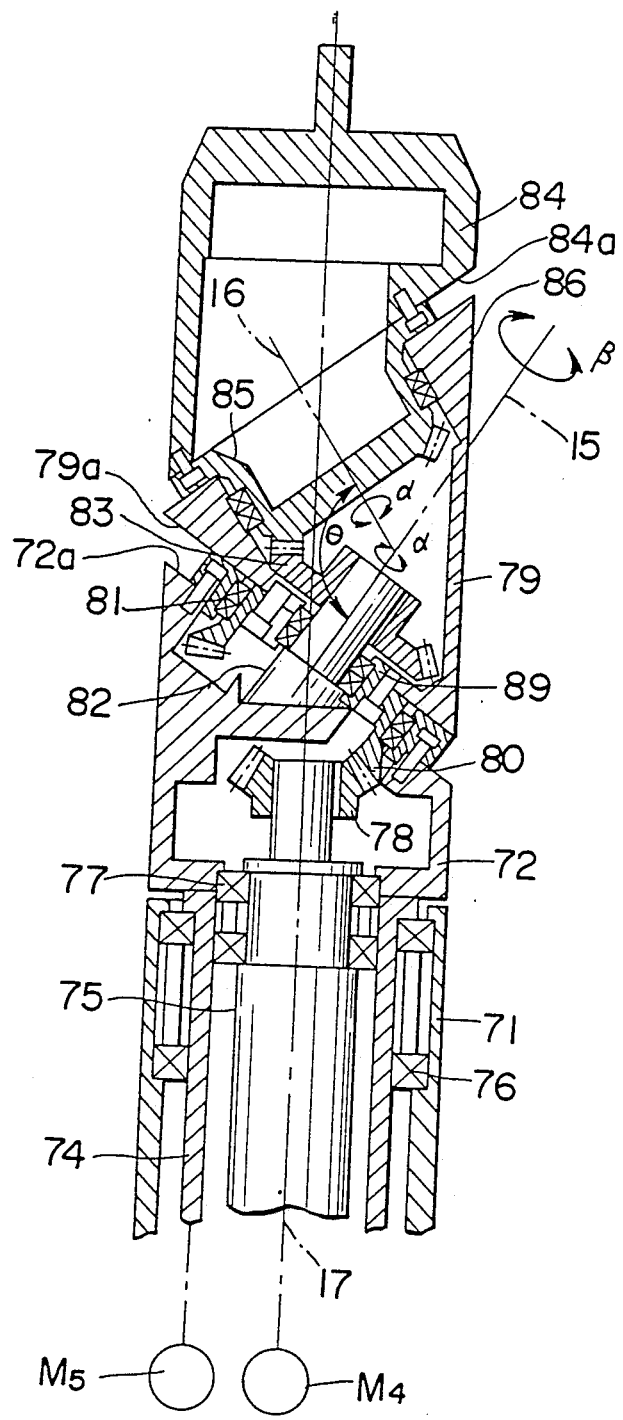
FIG. 10 is a partly broken away, axial-sectional view of a third embodiment of the present invention.
Figure 11:
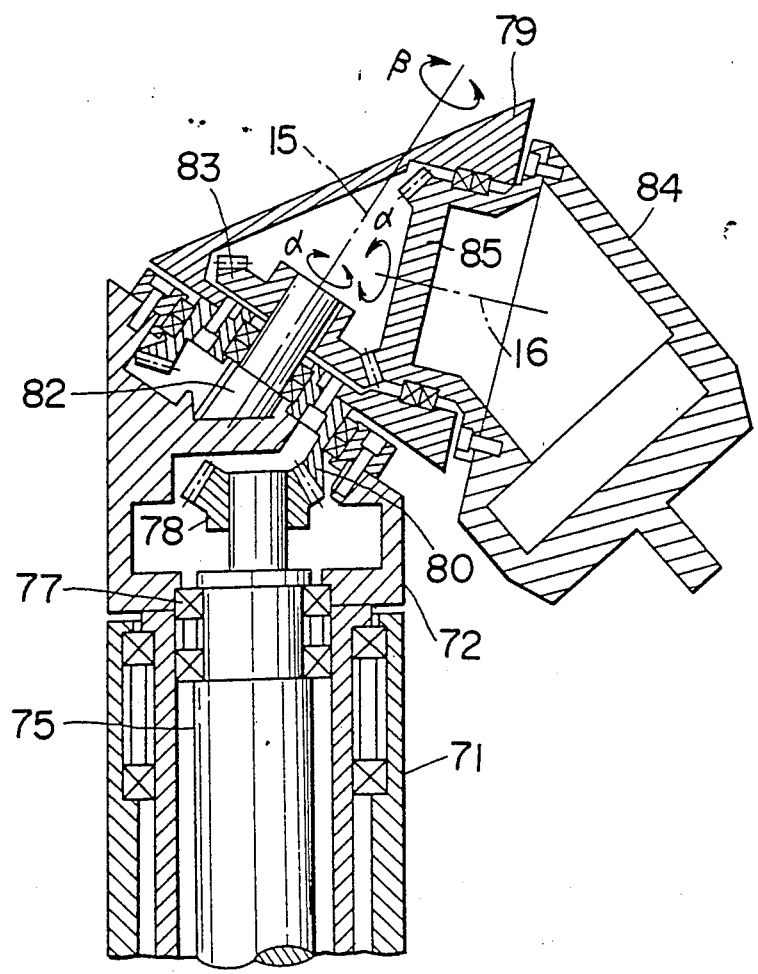
FIG. 11 is a partly broken away, axial-sectional view of the wrist mechanism in FIG. 10 when it is bent in a direction.
Figure 12:
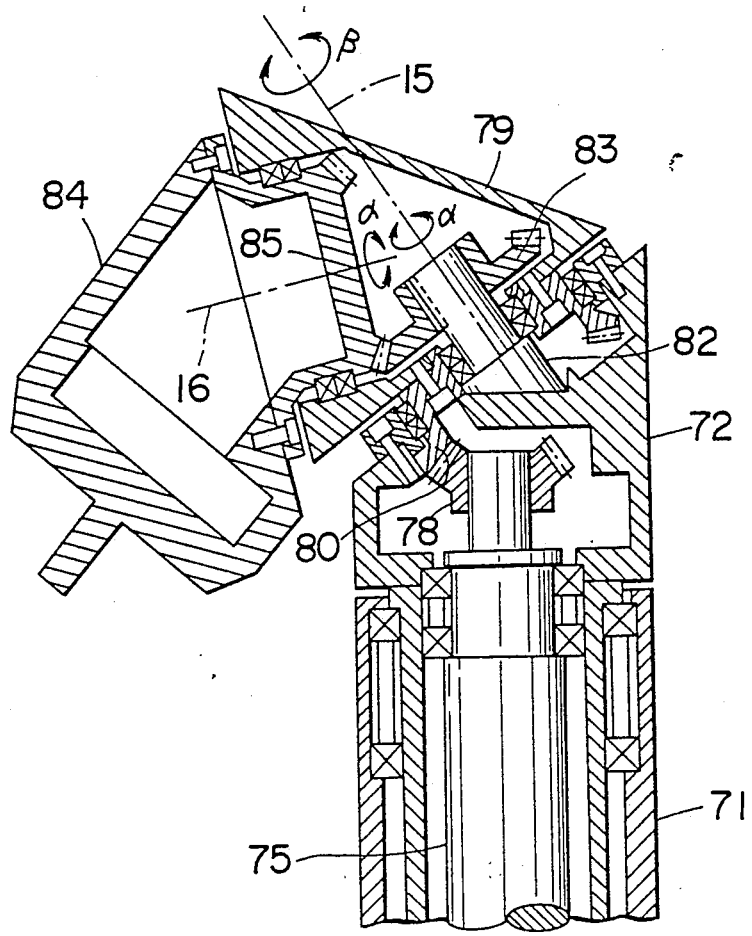
FIG. 12 is a partly broken away, axial-sectional view of the wrist mechanism in FIG. 10 when it is bent in another direction.

FIGS. 10 to 12 illustrates the third embodiment of the present invention. In this embodiment, a first end member 72 has a hollow cylindrical drive shaft 74 fixed to the rear end thereof so that the hollow cylindrical shaft 74 coaxially extends from the rear end of the first end member 72. The hollow cylindrical shaft 74 is coaxially fitted into a front end of a supporting arm 71 of an industrial robot (not shown) and further a cylindrical drive shaft 75 is coaxially fitted into the hollow cylindrical shaft 74. The shafts 74 and 75 are supported on ball bearings 76 and 77, respectively, to be rotatable about the axis 17 of the first end member 72. The shaft 75 is connected to an electric motor $M_4$ while the hollow cylindrical shaft 74 is connected to another electric motor $M_5$.

An intermediate member 79 has a toothed gear 80 fixed to rear end 79a thereof to be coaxial with the axis 15. The toothed gear 80 is rotatably supported through a pair of ball bearings 81 and 81 on a supporting ring 89 which is fastened to the front end 72a of the first end member 72. The toothed gear 80 is projected into the front end 72a of the first end member 72 to mesh with a bevel gear 78 which is mounted on the front end of the shaft 75.

The first end member 72 has a shaft 82 integrally formed with the front end 72a thereof to be coaxial with the axis 15 and to intersect the axis 17. The shaft 82 projects into the intermediate member 79 and has a bevel gear 83 mounted on its distal end.

A second end member 84 is provided at its rear end 84a with a bevel gear 85. The bevel gear 85 is disposed coaxially with the axis 16. The bevel gear 85 is projected into the intermediate member 79 and is rotatably supported on the intermediate member 79 through a pair of ball bearings 86 and 86. The bevel gear 85 meshes with the bevel gear 83. The axes 15 and 16 form a predetermined angle $\theta$.

With such a construction, the intermediate member 79 can be rotated a predetermined angle $\beta$ by controlling the rotation of the shaft 75 and by transmitting the rotation to the intermediate member 79 via bevel gears 78 and 80. When the gear ratio of the gear 83 over the gear 85 is 1:1, rotation of the hollow cylindrical shaft 74 is transmitted via the gears 83 and 85 to the second end member 84 with an equal rotation angle. Since the first rotation axis 15 and the second rotation axis 16 form the angle $\theta$, the wrist mechanism is, as shown in FIGS. 11 and 12, sufficiently bent with the second end member 84 directed to any desired point within the working space of the wrist mechanism when the rotation angles $\alpha$ and $\beta$ are controlled by independently rotating the shafts 74 and 75. Assuming that rotation angles $\alpha = 0°$ and $\beta = 0°$ when the wrist mechanism is in the position illustrated in FIG. 10, the wrist mechanism is placed in the position in FIG. 11 when the rotation angles $\alpha = 0°$ and $\beta = 180°$. When rotation angles $\alpha = 180°$ and $\beta = 0°$, it is placed in the position shown in FIG. 12. It will be understood that the smaller the angle $\theta$ between the first rotation axis 15 and the second rotation axis 16, the larger the working area of the wrist mechanism.

Figure 13:
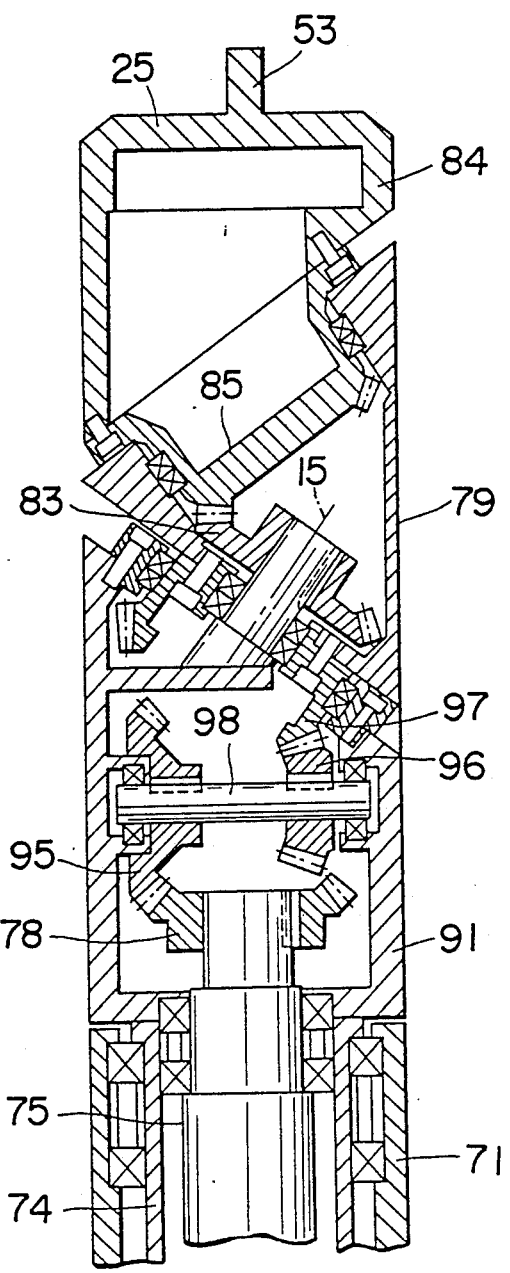
FIG. 13 is a partly broken away, axial-sectional view of a modified form of the wrist mechanism in FIG. 10.

FIG. 13 illustrates a modified form of the wrist mechanism in FIG. 10. This modification is distinct from the third embodiment in that idle bevel gears 95 and 96 are disposed within a first end member 91. The bevel gears 95 and 96 are mounted on a shaft 98 rotatably supported on the inner wall of the first end member 91, the shaft 98 perpendicularly crossing the axis of the first end member 91. The rotation of the shaft 75 is transmitted through the bevel gears 78, 95, 96 and 97 to the intermediate member 79, so that the intermediate member 79 is rotated relative to the first end member 91 about the axis 15. The performance of the wrist mechanism is improved by attaching a rotary actuator (not shown) to the attachment shaft 53 of the front end 25 of the second end member 84.

Figure 14:
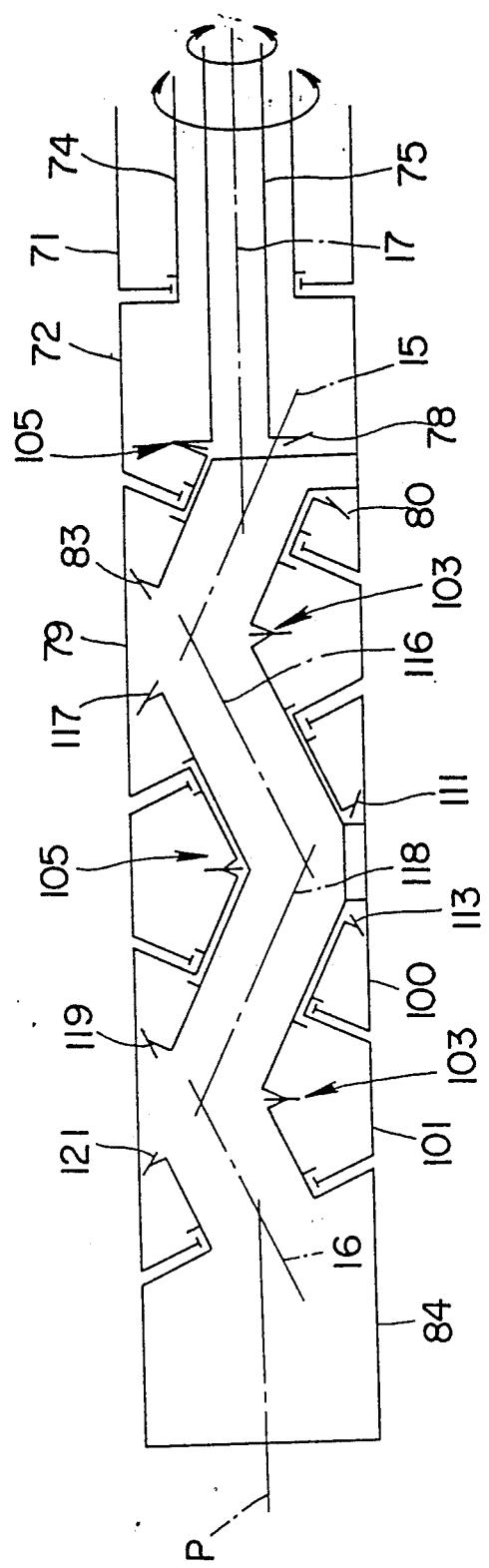
FIG. 14 is a diagrammatical axial-sectional view of a fourth embodiment of the present invention.
Figure 15:
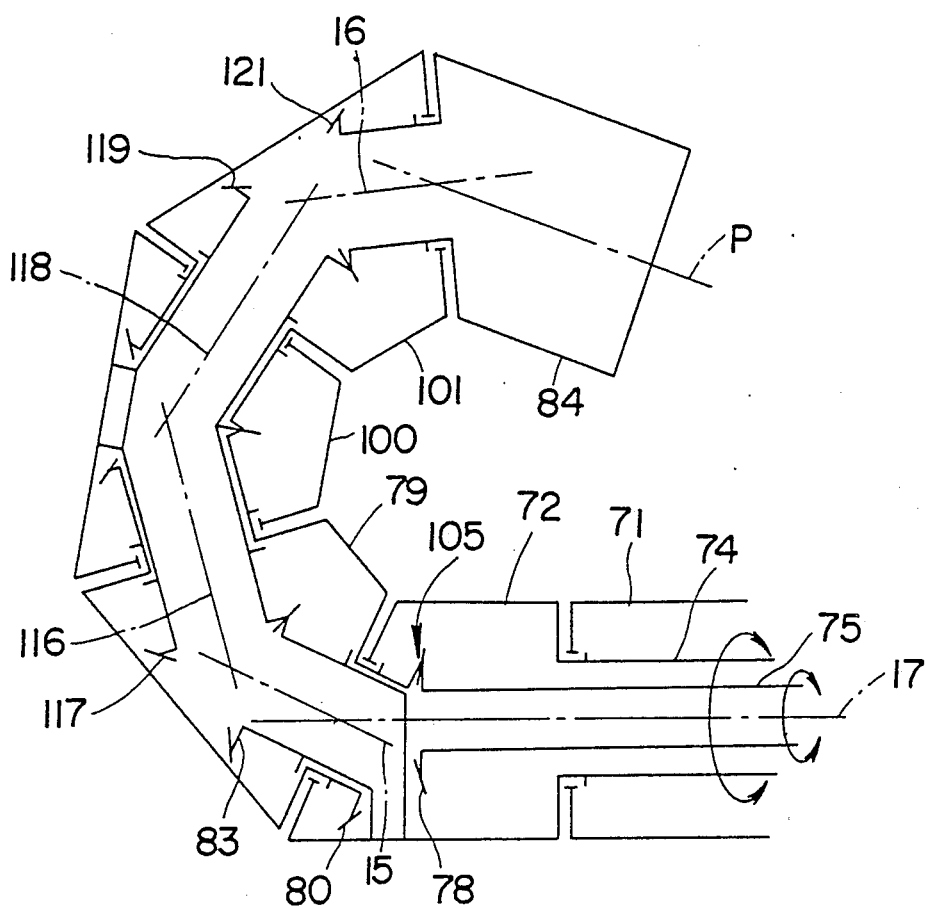
FIG. 15 is a diagrammatical axial-sectional view of the wrist mechanism in FIG. 14 when it is bent.

In FIGS. 14 and 15, there is diagrammatically illustrated the fourth embodiment of the present invention which is substantially distinct from the third embodiment in FIG. 10 in that hollow cylindrical second and third intermediate members 100 and 101 are provided. The first, second and third intermediate members 79, 100 and 101 and the first and second end members 72 and 84 are connected in series so that they are rotatable relative to adjacent members. More specifically, the intermediate members are arranged to be rotatable about rotation axes 15, 116, 118 and 16. Adjacent two rotation axes intersect with each other with a predetermined angle and all the rotation axes 15, 116, 118 and 16 are oriented to intersect the axis 17 of the first end member 72 in a zigzag manner when the wrist mechanism is in the position in FIG. 14. The rotation of the drive shaft 75 is transmitted to the intermediate members 79 and 101 through a first rotation transmission mechanism 105 including toothed wheels. The rotation of the drive shaft 74 is transmitted from the first end member 72 through the intermediate member 100 to the second end member 84 by means of a second rotation transmission mechanism 103 including toothed wheels. With the first and second transmission mechanisms, the first and second end members 72 and 84 and the intermediate member 100 are capable of rotating relative to the intermediate members 79 and 101.

In operation, for instance, the drive shaft 75 of the first rotating mechanism is rotated about its axis 17 with a condition that the first end member 72 is placed stationary relative to the arm 71 of the industrial robot. The rotation of the drive shaft 75 is transmitted through the engaging toothed wheels 78 and 80 to the first intermediate member 79, thereby causing to rotate the first intermediate member 79, which in turn rotates the third intermediate member 101 through the engaging toothed wheels 111 and 113. When the drive shaft 74 of the second rotating mechanism is rotated under the condition that the drive shaft 75 is set stationary relative to the arm 71 of the robot, the first end member 72 is rotated, causing the second intermediate member 100 to be rotated via engaging toothed wheels 83 and 117. This results in rotation of the second end member 84 via the engaging toothed wheels 119 and 121.

When the first intermediate member 79 is rotated 180° with respect to the first end member 72 by actuating the first rotating mechanism, the wrist mechanism in the position in FIG. 14 is shifted to a position shown in FIG. 15. During this rotation of the first intermediate member 79, the axis P of the second end member 84 or an operating tool (not shown) attached to the second end member 84 continuously changes its direction in FIG. 14 to, for instance, a direction illustrated in FIG. 15. Further, by independently controlling the first and second rotating mechanisms, the axis P of the second end member 84 may be oriented to any desired point within the working space of the wrist mechanism.

Figure 16:
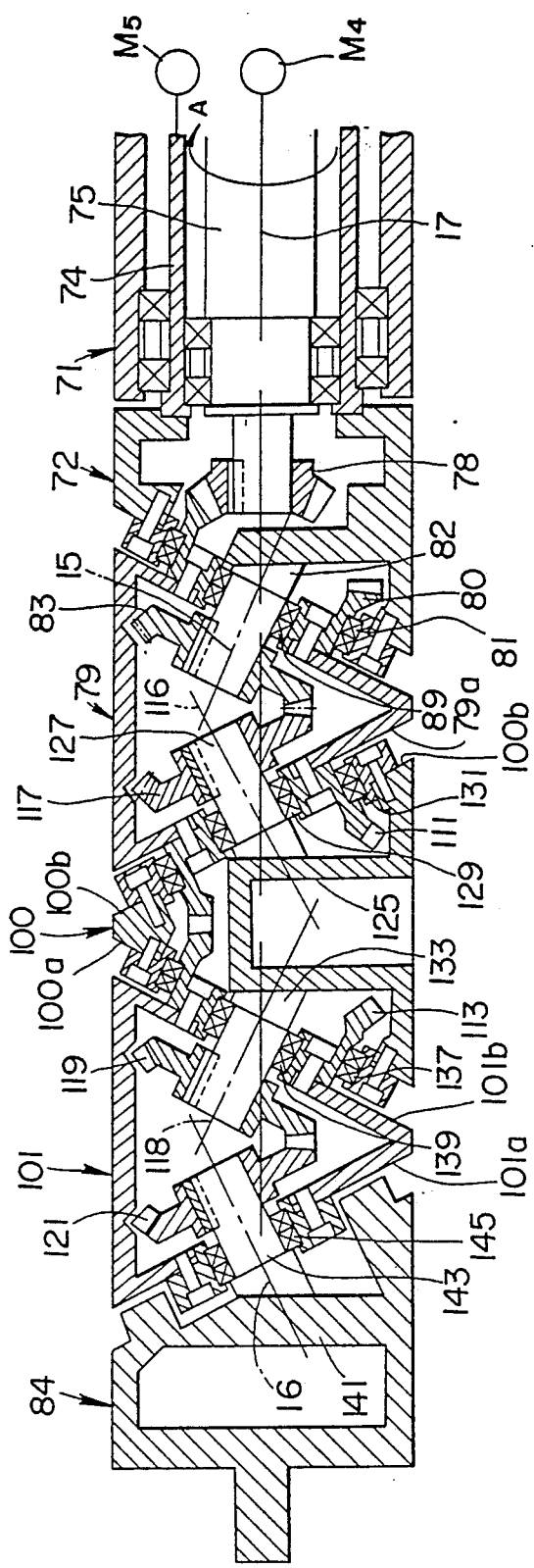
FIG. 16 is an enlarged, partly broken away, axial-sectional view of the wrist mechanism in FIG. 15.
Figure 17:
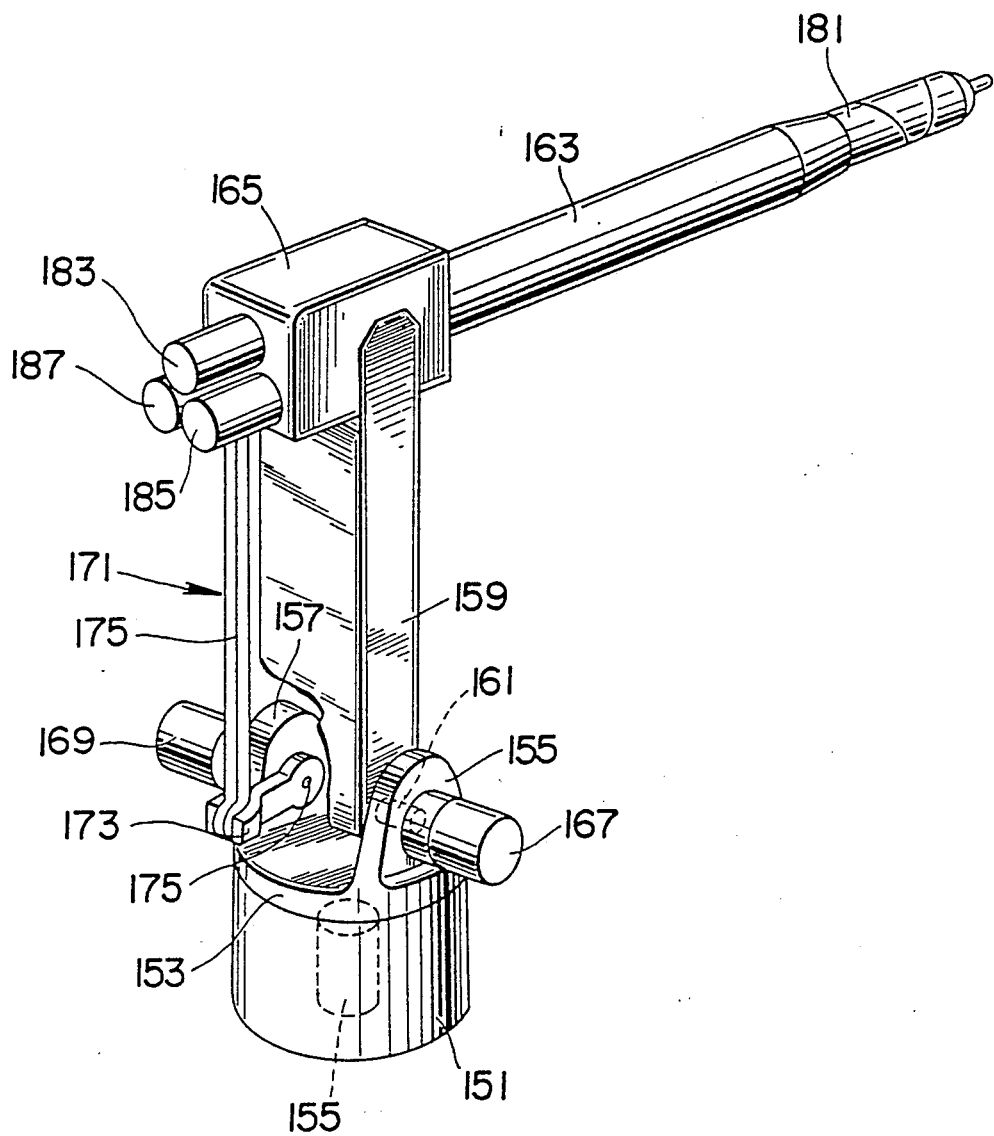
FIG. 17 is a perspective view of an industrial robot having a wrist mechanism of a fifth embodiment of the present invention incorporated into it.
Figure 18:
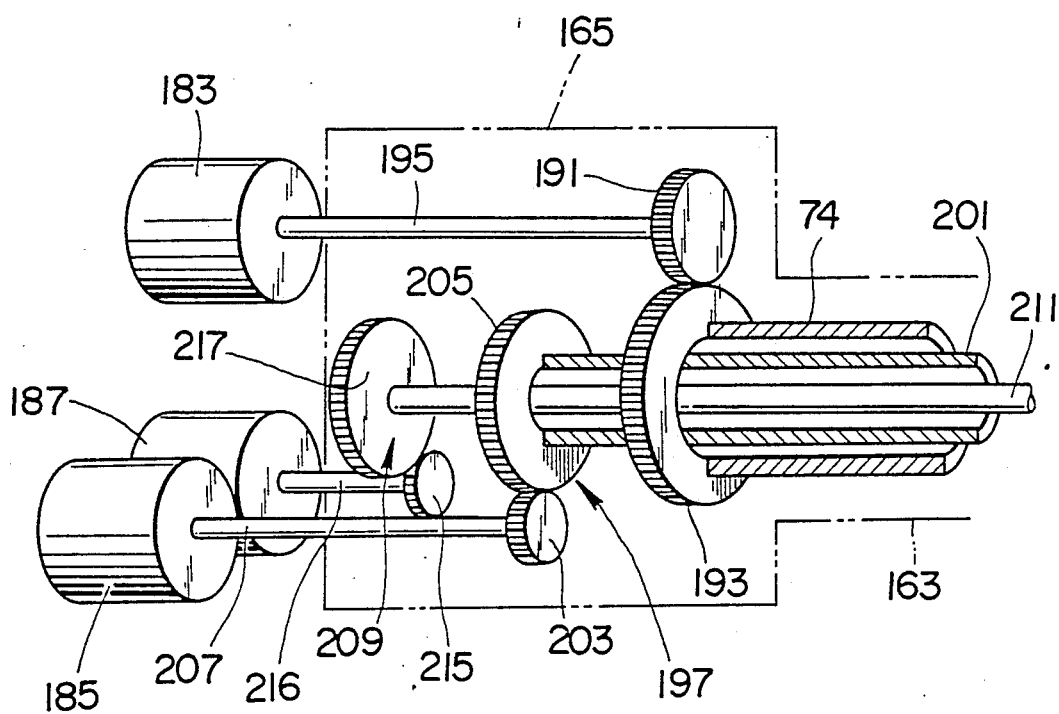
FIG. 18 is an enlarged perspective view, partly in section, of the rotation mechanisms of the wrist mechanism in FIG. 17.
Figure 19:
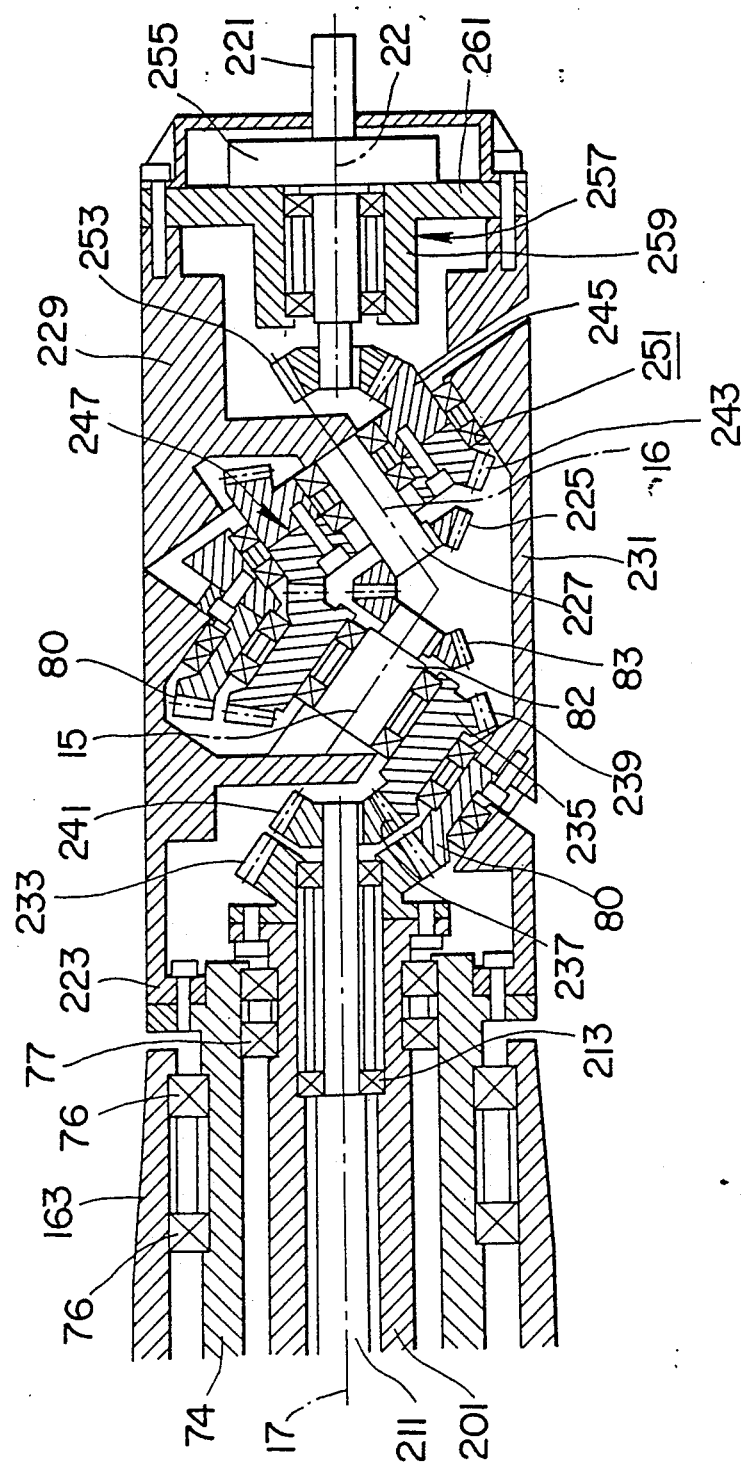
FIG. 19 is an enlarged axial-sectional view, partly broken away, of the wrist mechanism in FIG. 17.
Figure 20:
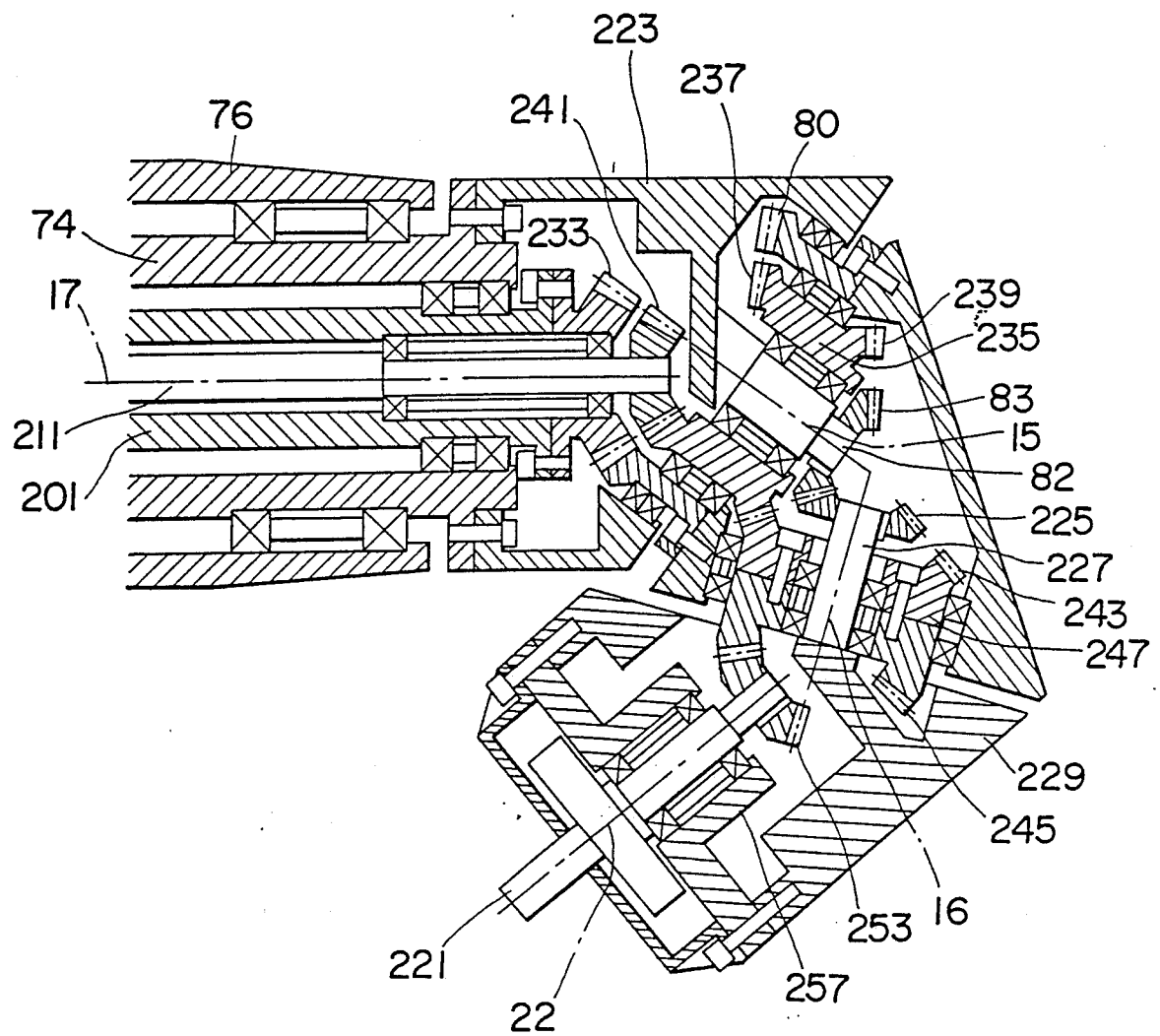
FIG. 20 is an axial-sectional view of the wrist mechanism in FIG. 19 when it is bent.

The fourth embodiment is illustrated in FIG. 16 in more specific form. The first intermediate member 79 is partly distinct from that of the third embodiment in FIG. 10 in that a bevel gear 111 is mounted on an inclined front end wall 79a of the first intermediate member 79 about the axis 116 so that the bevel gear 111 passes through an inclined rear end wall 100b of the second intermediate member 100 and into the latter. The second intermediate member 100 has a bracket 125 formed in the inner wall thereof so as to inwardly project. The bracket 125 is provided with a second shaft 127 which perpendicularly passes through the center of the rear end wall 100b of the second intermediate member 100 along the rotation axis 116. The second shaft 127 has a bevel gear 117 mounted on it so as to mesh with the bevel gear 83 of the first end member 72 within the first intermediate member 79. The second intermediate member 100 is supported by means of two pairs of ball bearings 129 and 129 and 131 and 131 on a cylindrical supporting portion of the bevel gear 111 so as to be rotatable about a rotation axis 116. The bracket 125 of the second intermediate member 100 is further provided with a third shaft 133 which perpendicularly passes through the center of an inclined rear end wall 101b of the third intermediate member 101 along a rotation axis 118. The third shaft 133 has a bevel gear 119 mounted on it so as to mesh with a bevel gear 121 of the second end member 84 within the third intermediate member 101. On the inclined rear end wall 101b of the third intermediate member 101, there is mounted a bevel gear 113 about the rotation axis 118 in the similar manner as in the bevel gear 111 so that the bevel gear 113 passes through the inclined front end wall 100a of the second intermediate member 100 to mesh with the bevel gear 111 of the first intermediate member 79. The third intermediate member 101 is supported by means of two pairs of ball bearings 137, 137 and 139, 139 on the second intermediate member 100 to be rotatable about the axis 118. The second end member 84 is provided with a partition wall 141 so as to face an inclined front end wall 101a of the third intermediate member 101. The partition wall 141 has a fourth shaft 143 integrally formed with it so as to pass through the center of the front end wall 101a into the third intermediate member 101 along the axis 16. The fourth shaft 143 has a bevel gear 121 concentrically mounted on it so as to mesh with the bevel gear 119 within the third intermediate member 101. The shaft 143 is supported on the third intermediate member 101 by means of a pair of ball bearings 145 and 145 to be rotatable about the rotation axis 16.

FIGS. 17 to 20 illustrate the fifth embodiment of the present invention, in which 151 designates a base, on which is rotatably mounted a rotating disc 153. The rotating disc 153 is adapted to rotate about a vertical axis by means of an electric motor 155 disposed within the base 151. The rotating disc 153 is provided on its upper face with a pair of parallel brackets 155 and 157. A pivotal column 159 is rotatably supported at its proximal end on the bracket 155 by passing a horizontal shaft 161, which is integrally formed at its proximal end, through bracket 155 and thus the pivotal column 159 is pivotable about a horizontal axis. To the free end of the pivotal column 159 there is provided a hollow arm 163 which has a rear end portion 165 having a rectilinear tubular shape. The rear end portion 165 of the hollow arm 163 is supported through a pair of horizontal shafts (not shown) on the distal end or free end of the pivotal column 159 so that the arm 163 is pivotable about a horizontal axis. The pivotal column 159 is pivoted by means of an electric motor 167 which is fixed to the bracket 155 and connected to the horizontal shaft 161. The arm 163 is pivoted by an electric motor 169, which is fixed to the bracket 157, through a link mechanism 171. The link mechanism 171 includes a crank arm 173, mounted on the rotating shaft 175 of the motor 169, and a link member 175 hinged at its one end to the crank arm 173 and at the other end to the rear end portion 165 of the arm 163. The arm 163 has a wrist mechanism 181 mounted at its front end and three electric motors 183, 185 and 187 mounted in parallel on its rear end.

The motors 183, 185 and 187 serve to drive the wrist mechanism 181. The motor 183 is connected to hollow cylindrical drive shaft 74 through a reduction unit including a toothed wheel 191, which is mounted on an output shaft 195 of the motor 183, and a toothed wheel 193 which is mounted on the drive shaft 74 and meshes with the toothed wheel 191. The drive shaft 74 is axially disposed within the arm 163 and is supported through bearings 76 on the inner wall of the arm 163 to be rotatable about the axis 17 of the arm 163. The motor 185 is connected through a reduction unit 197 to a hollow cylindrical drive shaft 201 which coaxially passes through the drive shaft 74 and is rotatably supported on the inner wall of the drive shaft 74 through bearings 77. The reduction unit 197 includes a toothed wheel 203, which is mounted on an output shaft 207 of the electric motor 185, and a toothed wheel 205 fixed to the rear end of the drive shaft 201 to be concentric with the shaft 201. The drive shaft 201 serves as the drive shaft 75 in FIG. 10. The motor 187 is connected via a third reduction unit 209 to a drive shaft 211 which concentrically passes through the shaft 201. The drive shaft 211 is rotatably supported on the inner wall of the hollow shaft 201 by means of bearings 213. The third reduction unit 209 has a toothed wheel 215 mounted on an output shaft 216 of the motor 187 and a toothed wheel 217 mounted on the rear end of the shaft 211 so as to mesh with the toothed wheel 215. These drive shafts 74, 201 and 211 are connected to the wrist mechanism 181.

The wrist mechanism 181 is substantially similar to the wrist mechanism in FIG. 10 in its outer shapes of the first and second end members and the intermediate member, but is distinct in that the wrist mechanism 181 is further provided with a rotating mechanism of an attachment shaft 221 for attaching an operating tool on it. Specifically, the first end member 223 is coaxially fastened to the front end of the drive shaft 74. The bevel gear 83 which is mounted on the shaft 82 of the first end member 223 meshes with a bevel gear 225 mounted on a shaft 227 fixed to the second end member 229. The shaft 227 extends along the axis 16 and is projected into the intermediate member 231. The shaft 201 is provided at its front end with a bevel gear 233. The bevel gear 233 meshes with the bevel gear 80 fixed to the intermediate member 231. Between the shaft 82 and the bevel gear 80 there is coaxially fitted a double bevel gear 235 to be rotatable about the axis 15 of the shaft 82 by means of bearings.

The double bevel gear 235 includes a hollow cylindrical portion having a pair of bevel gears 237 and 239 formed at its opposite ends. The bevel gear 237 meshes with a bevel gear 241 mounted on the forward end of the shaft 211. On the other hand, the bevel gear 239 engages with a bevel gear 243. The bevel gear 243 is coaxially fixed to another bevel gear 245 so that they face toward away from each other, thus forming a second double bevel gear 247. The second double bevel gear 247 is coaxially fitted around the shaft 227 so that the bevel gear 245 is projected into the second end member 229. The second double bevel gear 247 is supported by means of two pairs of bearings on the shaft 227 and the inner wall of a opening 251 of the intermediate member 231 so as to be rotatable about the axis 16. The bevel gear 245 of the second double bevel gear 247 meshes with a bevel gear 253 mounted on the attachment shaft 221. The attachment shaft 221 has a flange portion 255 integrally and concentrically formed with it. A rear end portion of the attachment shaft 221 concentrically passes through a hollow cylindrical portion 259 of a supporting member 257 and is supported on it by means of ball bearings so that the attachment shaft 221 is rotatable about an axis 22 of the second end member 229. The supporting member 257 has a flange portion 261 which radially outwardly extends from the front end of the hollow cylindrical portion 259 and is screwed at the flange portion 261 to the front end of the second end member 229.

In operation, the motor 155 is energized to turn the rotating disc 153 about the vertical axis, thus rotating the arm 163 in a horizontal plane. The motor 167 is energized to pivot the pivotal column 159 about the horizontal axis through the horizontal shaft 161, resulting in vertical movement of the arm 163. When the motor 169 is energized, the arm 163 is swung vertically through the link mechanism 171.

When the motor 183 is energized, the shaft 74 is rotated through the reduction unit and thus the first end member 223 are rotated about the axis 17. This rotation of the first end member 223 is transmitted through the bevel gears 83 and 225 to the second end member 229, thus rotating the latter about the axis 16. When the motor 185 is rotated, the shaft 201 is rotated via the reduction unit 197 and thereby the intermediate member 231 is rotated about the axis 15 via the bevel gears 233 and 80. As in the wrist mechanism in FIG. 10, the wrist mechanism 181 may be oriented to any desired direction by changing the relative angle of the intermediate end member 231 to the first and second end members 223 and 229 as well as the position of the arm 163.

When the motor 187 is rotated, the rotating shaft 211 is rotated through the reduction unit 209 and thus the attachment shaft 221 of the second end member 229 is rotated about the axis 22 via the bevel gears 241, 237, 239, 243, 245 and 253.

Figure 21:
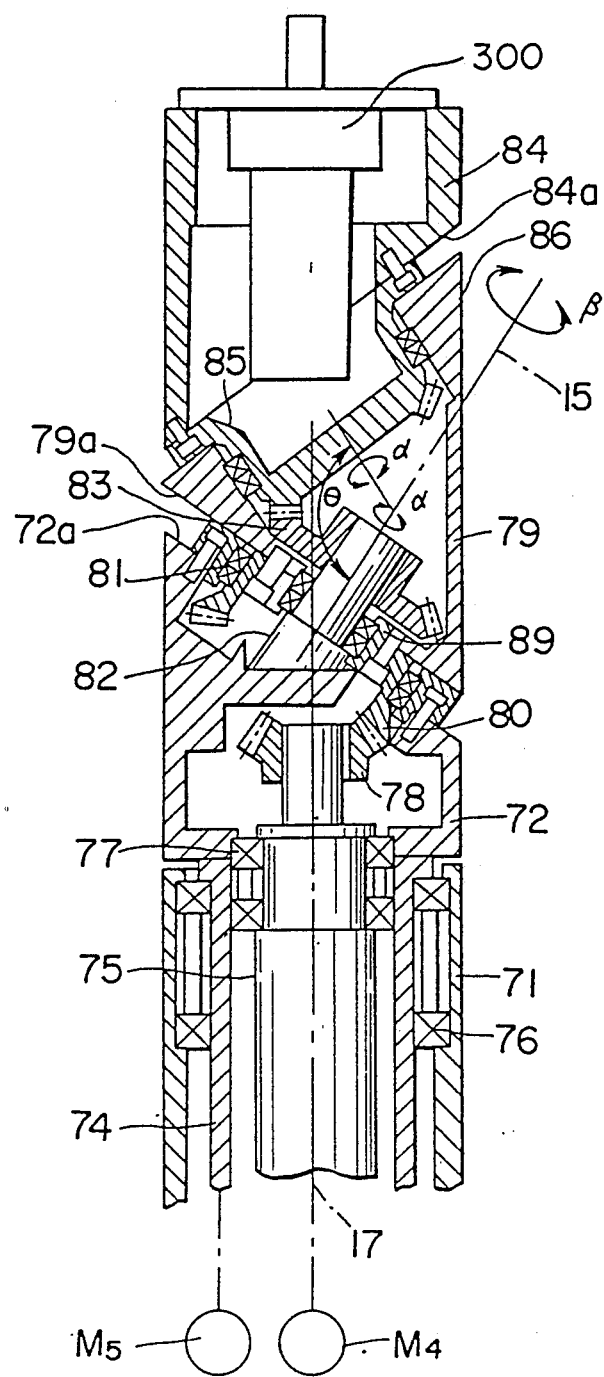
FIG. 21 is an axial-sectional view of another embodiment of the present invention.

FIG. 21 illustrates another embodiment of the present invention, which is distinct from the embodiment in FIG. 10 in that a rotary actuator 300 is mounted on an open front end of the second end member 84. This embodiment uses a DC servomotor as the rotary actuator 300 and with such a construction achieves ease of fabrication and reduction in cost.

What is claimed is:

1. A wrist mechanism comprising:
   at least three tubular rigid elements, said rigid elements being rotatively connected in series to form a tubular wrist so that adjacent two elements are rotatable relative to each other about a rotation axis, any two adjacent rotation axes intersecting each other;
   a first drive connected to a first rigid element in said rigid element series for rotating both said first rigid element and every second rigid element;
   a second drive for rotating every other rigid element, the latter having an opening extending therethrough from end to end thereof defined by a tubular wall;
   first transmission means connecting both said first rigid element and said every second rigid element in a movement-locking manner, for transmitting rotation from said first rigid element to said every second rigid element, said first transmission means extending through said opening in said every other rigid element within the confines of said tubular wall; and
   second transmission means, connecting both said second drive and said every other rigid element in a movement-locking manner, for transmitting rotation from said second drive to said every other rigid element, said second transmission means being arranged to be within said tubular wrist, whereby said first drive rotates both said first rigid element and every second rigid element in synchronous rotation relative to said every other rigid element, and said second drive rotates said every other rigid element in independent synchronous rotation relative to both said first rigid element and said every second rigid element.

2. A wrist mechanism as recited in claim 1, wherein:
   said rigid elements each have an element axis and opposite ends; said element axis of each rigid element passes through said opposite ends thereof; any adjacent two rigid elements are connected to face corresponding ends thereof to each other; and said corresponding ends of adjacent two rigid elements each have an inclined end wall slantingly crossing said element axis thereof, said each inclined end wall being perpendicular to said rotation axis thereof.

3. A wrist mechanism as recited in claim 2, wherein said first transmission means includes a universal joint for transmission of the rotation.

4. A wrist mechanism as recited in claim 3, wherein said second transmission means includes a universal joint for transmission of the rotation.

5. A wrist mechanism as recited in claim 2, wherein said first transmission means includes a gear train for transmission of the rotation.

6. A wrist mechanism as recited in claim 3, wherein said second transmission mean includes a gear train for transmission of the rotation.

7. A wrist mechanism as recited in claim 6, wherein said gear train has a gear ratio of 1.

8. A wrist mechanism as recited in claim 1 or 2 wherein said connected rigid elements comprise a front rigid element and a rear rigid element, and further comprising: a rotary actuator for attaching an operating tool thereon, said rotary actuator being mounted on said front rigid element; a third drive including a motor; and a third transmission means for transmitting rotation of said motor of said third drive to said rotary actuator.

9. A wrist mechanism as recited in claim 1 or 2, wherein said connected rigid elements comprise a front rigid element and a rear rigid element, and further comprising: an attachment shaft for attaching an operating tool thereon, said attachment shaft being supported on said front rigid element to be rotatable about an axis thereof; and a third drive including a motor and a transmission means for transmitting rotation of the motor to said attachment shaft.

10. A wrist mechanism as recited in claim 9, further comprising: a pivotal arm having a front end and a rear end portion; supporting means for supporting said pivotal arm at said rear end portion to be pivotable vertically and horizontally; and wherein: said rear rigid element is attached to said front end of said pivotal arm; said first drive comprises a first motor for rotating said every second rigid element; and said second drive comprises a second motor for rotating said other rigid element, said motors of said first, second and third drives being mounted on said rear end portion of said pivotal arm.

11. A wrist mechanism as recited in claim 1 or 2, wherein there are provided more than three rigid elements.

12. A wrist mechanism as recited in claim 8, wherein there are provided more than three rigid elements.

13. A wrist mechanism as recited in claim 10, wherein there are provided more than three rigid elements.

* * * * *